US008797901B2

(12) United States Patent
Ji et al.

(10) Patent No.: US 8,797,901 B2
(45) Date of Patent: Aug. 5, 2014

(54) METHOD AND ITS DEVICES OF NETWORK TCP TRAFFIC ONLINE IDENTIFICATION USING FEATURES IN THE HEAD OF THE DATA FLOW

(75) Inventors: Yuefeng Ji, Beijing (CN); Rentao Gu, Beijing (CN); Hongxiang Wang, Beijing (CN)

(73) Assignee: Beijing University of Posts and Telecommunicaions, Beijing (CN)

( * ) Notice: Subject to any disclaimer, the term of this patent is extended or adjusted under 35 U.S.C. 154(b) by 232 days.

(21) Appl. No.: 13/379,312

(22) PCT Filed: Jul. 14, 2010

(86) PCT No.: PCT/CN2010/075151
§ 371 (c)(1),
(2), (4) Date: Dec. 19, 2011

(87) PCT Pub. No.: WO2011/130957
PCT Pub. Date: Oct. 27, 2011

(65) Prior Publication Data
US 2012/0099465 A1    Apr. 26, 2012

(30) Foreign Application Priority Data

Apr. 22, 2010  (CN) .......................... 2010 1 0152750

(51) Int. Cl.
*H04L 12/26* (2006.01)
*H04L 12/24* (2006.01)
*H04L 12/56* (2006.01)
*H04L 12/00* (2006.01)

(52) U.S. Cl.
CPC .............. *H04L 41/142* (2013.01); *H04L 45/38* (2013.01); *H04L 47/2441* (2013.01)
USPC ........... 370/252; 370/229; 370/230; 370/235; 709/234

(58) Field of Classification Search
None
See application file for complete search history.

(56) References Cited

U.S. PATENT DOCUMENTS

| 7,096,074 B2* | 8/2006 | Yulevitch et al. ............... 700/21 |
| 7,590,513 B2* | 9/2009 | Jiang et al. ........................ 703/2 |
| 2004/0083299 A1* | 4/2004 | Dietz et al. ..................... 709/230 |
| 2005/0193281 A1* | 9/2005 | Ide et al. .......................... 714/47 |
| 2007/0076606 A1* | 4/2007 | Olesinski et al. ............. 370/230 |
| 2007/0294187 A1* | 12/2007 | Scherrer ......................... 705/75 |
| 2009/0213747 A1* | 8/2009 | Enomoto ....................... 370/252 |

FOREIGN PATENT DOCUMENTS

| CN | 101184000 A | 5/2008 |
| CN | 101645806 A | 2/2010 |

* cited by examiner

*Primary Examiner* — Hanh N Nguyen
*Assistant Examiner* — Joshua A Kading
(74) *Attorney, Agent, or Firm* — Birch, Stewart, Kolasch & Birch, LLP

(57) ABSTRACT

Online TCP traffic identification using features in the head of the data flow wherein parameters of a number of packets in the head of the data flow such as packet length are extended with modified packet interval time and so on to establish the protocol features library according to the joint probability distribution. The protocol type of the data flow is obtained through comparing the packets features in the head of the data flow with the protocol features library. Data flow separation module, features extraction module, classification arbitration module and protocol features library module are included. The present invention weakens the impact that the round-trip delay has significantly on the protocol features, can accurately identify various TCP-based application-layer services and support online traffic identification. The identification process is suitable for hardware devices implementation and can be used in devices and systems that need online traffic identification in high-speed backbone network.

10 Claims, 2 Drawing Sheets

METHOD AND ITS DEVICES OF NETWORK TCP TRAFFIC ONLINE IDENTIFICATION USING FEATURES IN THE HEAD OF THE DATA FLOW

FIELD OF THE INVENTION

The present invention relates to a method and its devices of network traffic identification and, more particularly, to a method and devices of online TCP traffic identification using features in the head of the data flow, belongs to communication technology.

BACKGROUND OF THE INVENTION

As the network and services becomes complex, people need better management and monitoring of the network operation and transmitted content. Firstly, from the point of services, the increasing trend of service diversity, makes differentiating quality of services (QoS) requirements a challenge. Network should try to meet the QoS requirements of the services, but the premise is to get and analyze QoS. This requires us to perform online service classification, in order to classify the different services during transmission effectively, groom the traffic in accordance with the established strategy, and measure the services performance of application layer and complete user billing. Secondly, from the point of network planning and optimization, network administrators need to analyze the component of existing traffic, in order to optimize the existing network structure or plan new network construction. The latter does not require online identification methods, which can be analyzed with offline manner. In addition, from the point of network security, we need to wipe out the harmful traffic such as the worms and restrain its spread, which also need traffic identification technology as a support.

Existing traffic identification technology is mainly based on the transport layer port and application layer payload (signature). Since the abuse of the port number, especially P2P service uses dynamic ports or even use port 80 of HTTP protocol as transmission channel, make the application identification method based on the transport layer port lose its effectiveness. Since the method which is based on the application layer payload involves more complex operations, it is not suitable for high-speed backbone network traffic identification. Because of computational complexity and the inherent features of serial processing, the traffic identification method with artificial intelligence is not suitable for hardware implementation of network equipment, which limits its application in high-speed backbone network.

In order to meet the current and future needs of high-speed backbone network, traffic identification technology urgently needs the following requirements: 1) avoid using the port or payload as the main identification features when choosing parameters; 2) enable online identification when design the algorithms; 3) use the processing method that has the features of parallel processing and is easy to implement on the hardware.

SUMMARY OF THE INVENTION

The present invention provides a method and its devices of online TCP traffic identification using features in the head of the data flow. It firstly extracts the parameters such as packet length of a number of packets from the head part of the data flow, modified packet interval time and etc., secondly compares the parameters with the prior extracted protocol features library, then obtains the type of the data flow.

To achieve the above purpose of the invention, the present invention uses the following technical solutions:

A method of online TCP traffic identification using features in the head of the data flow has the following steps:

Step 1, pre-access real traffic data: collecting a number of real traffic data sets over the network;

Step 2, pre-sort the real traffic data flow: separating the real network traffic data sets which are obtained in Step 1 into different TCP flows by looking for the start packet in the data flow and the quintuple form {source address, destination address, source port, destination port, transport protocol type};

Step 3, classify the sets of TCP flows artificially: classify the sets of TCP flows which are obtained in Step 2 artificially into different categories so that each TCP flow in step 2 is associated with a corresponding type of protocol;

Step 4, extract the packet features of TCP flows: getting the packet features of each TCP flow, and constructing the features sequence according to the order of the packets in this TCP flow.

Step 5, establish the protocol features library: establishing several groups of matrices according to the protocol type of TCP flow in Step 3 and the features sequence of TCP flow in Step 4. Each matrix stores the joint probability density of the same serial number packet features of the TCP flow corresponding to the same protocol, so that each type of protocol has a set of corresponding joint probability density matrix. The joint probability density matrix stores joint probability density of head packet features of the TCP flow corresponding to this type of protocol;

Step 6, extract the packet features of the TCP flow to be analyzed: In accordance with the order of the packet in the TCP flow, extract these packet's features in turn, so as to form a features sequence;

Step 7, compare with the protocol features library: compare the features sequence obtained in step 6 with the protocol features library obtained in Step 5, in order to get the probability value that this TCP flow belongs to some kind of protocol;

Step 8, the arbitration of protocol classification: determine the protocol type of TCP flows corresponding to the maximum probability value for the respective protocol type according to the probability value in Step 7.

Before the traffic identification device is used in the online identification of the network traffic, we should pre-collect data with offline approach, artificially classify the sets of TCP flows, extract the packet features, and establish the protocol features library.

In step 4, we just extract some packet features from the head of the data flow, rather than the properties of the entire data flow.

The packet features described includes one or several kinds of the following features:

Features of individual packet;

Features of several associated packets;

In Step 6, the features sequence described includes packet length, packet interval time and the transmission direction parameter.

When calculating the packet interval time, deduct the influence of the round-trip delay.

The features sequence collected complies with the order of packet arrived in the same data flow.

In Step 8, decision is made according to the maximum probability principle or the maximum weighted probability principle.

A TCP traffic online identification device, which is used to implement the TCP flow online identification method with the use of the features in the head of the data flow, includes online part and offline part. The offline part includes protocol features library module; the online part includes sequence connected data flow separation module, features extraction module and classification arbitration module. The classification arbitration module connects to the protocol feature library module, its features are:

Data flow separation module, is used to separate network real traffic data set into different TCP flow according to quintuple form {the source address, the destination address, the source port, the destination port, the transport layer protocol type};

Features extraction module, is used to extract some packet features from the head of the TCP flow in order, and construct the features sequence according to the order of the packets in this TCP flow.

Classification arbitration module, is used to compare the features sequence with the protocol features library, arbitrate according to the maximum probability principle or the maximum weighted probability principle.

Protocol features library module, is used to provide protocol features library in order to store the protocol features obtained through analysis of the pre-access data; In the mentioned features library, establish several groups of matrices according to the protocol type and features sequence of the TCP flows. Each matrix stores the joint probability density of the same serial number packet features of the TCP flow corresponding to the same protocol, so that each protocol has a set of corresponding joint probability density matrix. The joint probability density matrix stores joint probability density of head packet features of the TCP flow corresponding to this type of protocol;

Therefore, a method and its devices of network traffic identification that provided by the present invention, only needs to extract some packet information from the head of the data flow in identification process rather than the information of entire data flow. It avoids checking the payload of the data flow. Thus the parameters extraction process is simple, and conducive to realizing online real-time identification of network data, in the classification arbitration process, the way of using the joint probability density avoids the complex regular operation. And multi-chip storage structure of matrix is quite suitable for hardware parallelization operation. Thus the process mode is greatly simpler than the traditional methods. In short, low parameters extraction demand, efficient calculation approach, accurate traffic classification results, and the feature of easily realizing online on the hardware constitute the greatest feature of the present invention.

DESCRIPTION OF THE DRAWINGS

In order to explain the present invention more clearly, the text below will simply describes the drawings that the present invention needed in the introduction of the embodiments. Apparently, the drawings below are only some embodiments of the present invention. The ordinary technical personnel in this field, without paying creative labor as premise, can also obtain more drawings according to these drawings.

SPECIFIC IMPLEMENTATION METHODS

The following text will describe the technical solution in the embodiments of the present invention clearly and completely, combining with the drawings in the embodiments of the present invention. Obviously, the embodiments described are only part of the embodiments of the present invention rather than all the embodiments. All the other embodiments that obtained by the ordinary technical personnel in this field based on the embodiments of the present invention without paying creative labor as premise belong to the protection range of the present invention.

Figure 1:
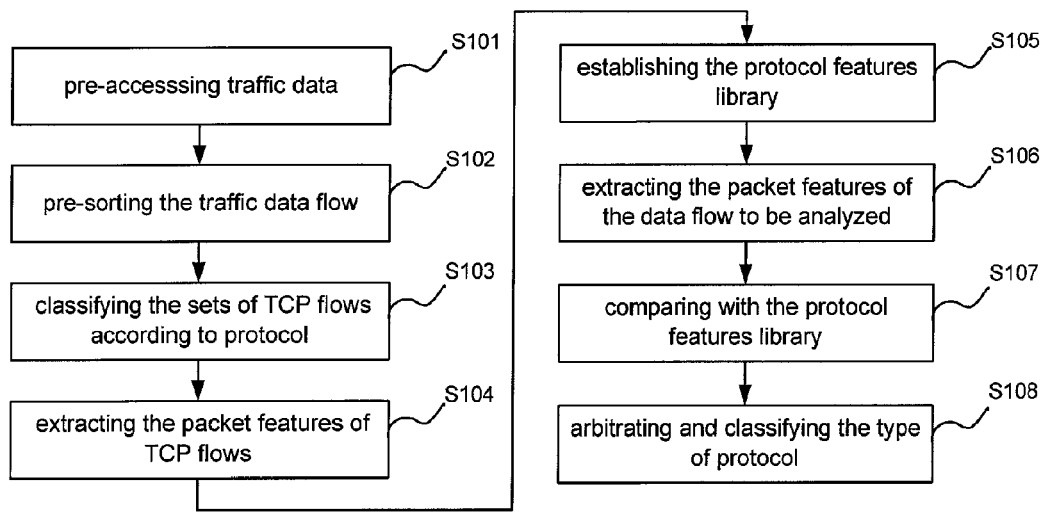
FIG. 1 is a flow chart of the traffic identification method that an embodiment of the present invention provided.

FIG. 1 is a flow chart of the traffic identification method that an embodiment of the present invention provided. As shown in FIG. 1, this method includes:

S101: Collect several network traffic data sets in different time from different places;

Network traffic identification devices are generally deployed in certain network. In order to improve the accuracy of the protocol features library, need the network probes to be set in the network to deploy, so that the network probes can collect real traffic data sets from the network. The above network probes can be part of the traffic identification devices, also can be deployed in the network independently, its main effect is to collect information of the network. The above real traffic data sets include the information that is used to conform the protocol type through checking the payload or other ways, and the packet length, the packet interval time and so on as feature parameters for subsequent steps; at the same time, the ones that have nothing to do with the concerned traffic type are eliminated from the traffic data sets. Obviously, the real traffic data sets described in S101 can be obtained from the network bearing numerous users through the way of probe, including real traffic data sets that obtained through other ways, such as artificial WWW traffic that generated in some terminals and collected from the transmission path.

S102: Comb the traffic data that collected, in order to constitute a set of TCP flows;

From the point of transport layer protocol, the data flows include at least TCP flows and UDP flows. The parameters that are used by some existing traffic identification methods are average features of packets in a data flow, such as: the average packet length, the average packet interval. But the parameters used by this method contains the order information of the packets, so we need to separate the traffic data sets which are obtained in S101 into different TCP flows according to the quintuple form {source address, destination address, source port, destination port, transport protocol type}, then the traffic data sets are made sets of TCP flows; Among them, the judgment basis of TCP flows' head can use, but not limited to Setup, Setup/ACK, ACK packets of TCP flows; And the packets of a data flow must arrange in accordance with the order of arriving at the observation.

S103: Classify the TCP data flows obtained according to the protocol types.

Obtain the protocol types of the TCP data flows offline with the way of payload analysis method, etc, such as WWW, MAIL, FTP, P2P, etc. Note that the algorithm used by S103 is not limited to payload analysis method. But no matter what kind of algorithm is used, it is necessary to ensure the high accuracy, in order to ensure the precision of the protocol features library.

S104: Extract the features of the TCP flows and preprocess the data;

In the present invention, only need to extract packet length, modified packet interval time, transmission direction of a number of packets from the head of each data flow. The number of the packets can be adjusted according to actual test case, the suggested number is 5~10. Because packet length and modified packet interval time have large range and need discretization, maybe need data to be normalized. For example, use Log function, arctan function to process the original data, and choose the proper discrete scale. At the same time, since some of the packets are retransmitted because of being lost and having excess delay, this part of data can be eliminated in order to improve the precision. In this step, each data flow can get the following features sequence: {{the first packet length, the first modified packet interval time, the first transmission direction}, {the second packet length, the second modified packet interval time, the second transmission direction}, {the third packet length, the third modified packet interval time, the third transmission direction}, . . . , {the n-packet length, the n-modified packet interval time, the n-transmission direction}}, among them, n stands for the number of the used data packets in the head of the data flow.

S105: Establish a group of matrices for each kind of protocol, storing the joint probability distribution of the packets features of this protocol data flow in order.

S104 in FIG. 1 got the features sequence of each flow, this step will do statistic of the joint probability distribution of the data flow features sequence which belongs to the same kind of protocol. Take WWW relevant protocol for example, it can get the two-dimensional joint probability distribution of the first packet of all the WWW data flow, and store this distribution in a two-dimensional matrix according to the features of the first packet {the first packet length, the first modified packet interval time, the first transmission direction} of all the WWW data flow in the assemblage. Among them, the packet length and the modified packet interval time form the two coordinate axes, the transmission direction can be illustrated through the plus-minus of the packet length. The value of each unit in the matrix is the probability density of the packet length and the modified packet interval time corresponding to the first packet of WWW data flow. The purpose is to reflect the statistical properties of the first packet of WWW services through the joint probability density. Similarly it can get the second matrix to reflect the features of the second packet of WWW services. Thus we can get n WWW matrix, which reflect the features of the n former packets of WWW data flow. Similarly, it can obtain n matrixes of other protocol type. These matrixes constitute the protocol features library together.

S106: After the traffic identification devices are deployed, once it needs to analyze an unknown data flow, it firstly extracts the packets features of this data flow.

If S105 uses the features of the n former packets, then S106 will also extract features of the n former packets in this data flow, forming a feature sequence: {{the first packet length, the first modified packet interval time, the first transmission direction}, {the second packet length, the second modified packet interval time, the second transmission direction}, {the third packet length, the third modified packet interval time, the third transmission direction}, . . . , {the n-packet length, the n-modified packet interval time, the n-transmission direction}}, among them, n stands for the number of the used data packets in the head of the data flow.

S107: Compare the features of the unknown data flow with the known protocol features library, obtaining the probability values that this data flow belongs to some protocol.

Compare the feature sequence of the unknown data flow obtained from S106 with the protocol features library obtained from S105, in accordance with {the i-packet length, the i-modified packet interval time, the i-transmission direction}, it is easy to get probability of the certain protocol type from the protocol features library. The mean value of probability from the n former packet can be considered as the probability that the data flow belongs to this protocol.

S108: Put the probability values from S107 together, if one probability value is biggest, that means the data flow belongs to the certain protocol type. In S108, it can also use the method of weighted correction to arbitrate which protocol type the data flow belongs to.

Figure 2:
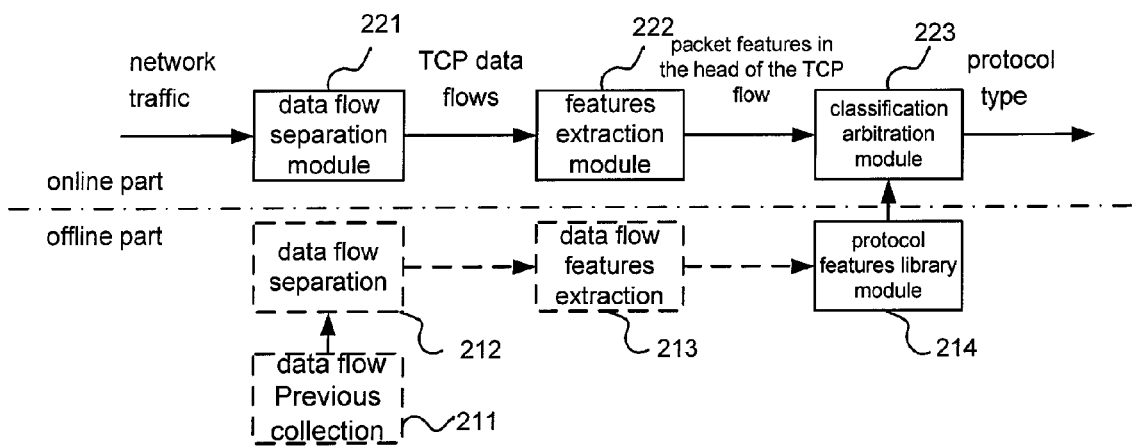
FIG. 2 is a structure diagram of the traffic identification devices that an embodiment of the present invention provided.

FIG. 2 is the structure diagram of the traffic identification devices provided by the present invention. From the function, the traffic identification devices can be divided into two parts named online and offline. The offline part mainly completes the structure of the protocol features library, and the online part is mainly responsible for the classification of unknown data flow. Offline part includes sequence connected data flow previous collection module 211, data flow separation module 212, data flow features extraction module 213 and protocol features library module 214; The online part includes sequence connected data flow separation module 221, features extraction module 222 and classification arbitration module 223, and classification arbitration module 223 connects to the protocol features library module 214.

In these traffic identification devices, data flow previous collection module 211, data flow separation module 212, data flow features extraction module 213 can be completed before the devices are deployed, so they are not the necessary component in the traffic identification devices or systems. Data flow separation module 221, features extraction module 222 and classification arbitration module 223 and protocol features library module 214 should be appeared in the traffic identification devices or systems in common.

Specific functions and process of each module as follows: before the use of devices or systems with the traffic identification, it needs to use the probe to process data flow previous collection module 211, data flow separation module 212, data flow features extraction module 213 to complete the work of S101~S105 in FIG. 1, establish the protocol features library module 214. Among them, protocol features library module 214 can generally be placed in the memory in the devices, such as ROM, FLASN and so on. When an unknown traffic goes into the traffic identification devices, Data flow separation module 221 will look for the head of TCP flows, and according to the quintuple form {source address, destination address, source port, destination port, transport protocol type}, separate traffic in accordance with the data flow; features extraction module 222 extracts packet length, modified packet interval time, transmission direction and other parameters according to the packet order, forms the features sequences, and transfer into the classification arbitration module 223, to complete the work S106 in FIG. 1. Classification arbitration module will judge the classification according to the protocol joint probability distribution information through reading the protocol features library module to complete the S107~S108 content in FIG. 1. It is worth mentioning that: because there are libraries of several protocols in the protocol features library, the calculation of the probability which the data flow belong to some kind of protocol can be in parallel; at the same time, Data flow separation module 221, features extraction module 222 and classification arbitration module 223 constitute the pipeline mode, which can greatly improve the traffic identification throughput of the devices.

Figure 3:
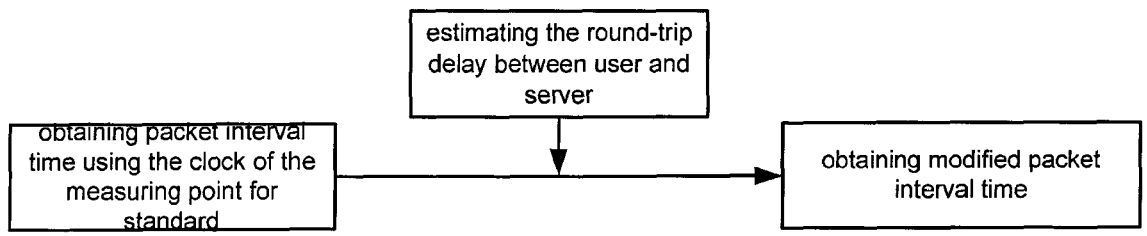
FIG. 3 is a diagram of the modified interval time description in an embodiment of the present invention.

FIG. 3 is a diagram of the modified interval time description in one embodiment of the present invention. Some traffic identification methods use the packet interval time as a feature for traffic identification, but the packet interval time is greatly influenced by the network status, especially round-trip delay time has direct and greatly influence on the packet interval time, make it not well reflect the features of the protocol. The present invention uses modified packet interval time, which is the time deduct the influence of the round-trip delay time in the traditional packet interval time. In one embodiment of the present invention, measure the interval time T between the adjacent packets in the same data flow using the clock of the measuring point for standard, and estimate the data flow round-trip delay R between the two end points, the modified packet interval time is T-R. In this way, weaken the influence that the round-trip delay has on the packet interval time, and enhance the significance of protocol features.

Figure 4:
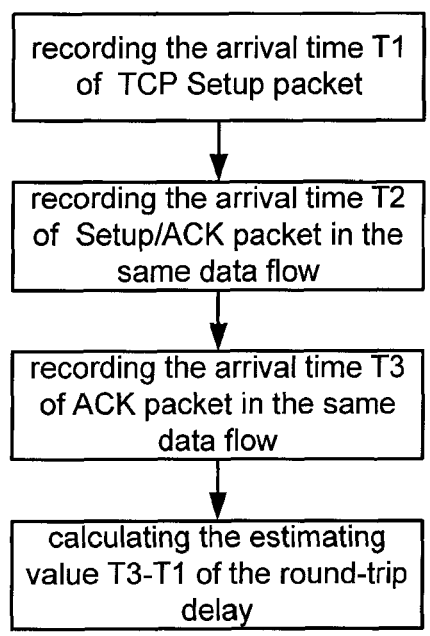
FIG. 4 is a flow chart of the round-trip delay measurement that an embodiment of the present invention provided.

FIG. 4 is a flow chart which is provided by one embodiment of the present invention about the round-trip delay measurement. Because the TCP connection only requires very little processing time to setup, this embodiment uses TCP three-way handshake mechanism to estimate the round-trip delay, that is if the measuring point finds up the TCP Setup packet, we record the packet arrival time T1, at the same time, wait for the same data flow TCP Setup/ACK packet appearing, once finding up, record the arrival time T2, then wait for and record the TCP ACK packet arrival time T3. T3-T1 is as the estimate round-trip delay time between the two end points.

The method and devices provided by the embodiments, use the properties of the packet itself to avoid the payload checking; use modified packet interval time to enhances the significance of the protocol features and avoid the influence that the round-trip delay has on the results; use joint probability density as the means of features analysis and the matrix storage structure to avoid the complex calculations, and easily implement on the hardware. This method only uses several packet features in the head of the data flow rather than the whole information of the data flow so it can easily achieve online identification.

Finally, it should be noted that: The above embodiment only used to illustrate the technical solution of the present invention, rather than limit it; despite reference to the aforementioned embodiments to make a detailed description for the present invention, the ordinary technical personnel in this field should understand; they can still amend the technical solution recorded in the foregoing embodiment, or replace the same technical features; However, the modifying or replacing, do not make the nature of the corresponding technical solutions break away from the spirit and scope of the technical solutions of the embodiments in the present invention.

The invention claimed is:

1. A method of online TCP (Transmission Control Protocol) traffic identification using a TCP online identification device in which:
a first data flow separation module, a features extraction module, and a classification arbitration module are connected in sequence one after another, and
with the classification arbitration module being connected to a protocol features library module,
the method comprising:
using features in a header of a TCP flow, in Steps including:
Step 1, accessing live traffic data sets by collecting a number of live traffic data sets over a network;
Step 2, sorting the live traffic data sets by separating the live network traffic data sets obtained in Step 1 into different TCP flows by looking for a start packet in each of the data flows, and a source address, a destination address, a source port, a destination port, and a transport layer protocol type of each packet in the data flows;
Step 3, classifying the traffic data sets of the TCP flows obtained in Step 2 into different categories so that each of the TCP flows in Step 2 is associated with a corresponding one of the transport layer protocol types;
Step 4, extracting features of the packets from each of the TCP flows, and constructing a sequence of the extracted features according to an order in which the packets are received in each of the TCP flows;
Step 5, using the protocol features library to store the extracted features of the packets obtained through analysis of the live traffic data sets; and to establish additional groups of probability density matrices according to the transport layer protocol type of the TCP flows in Step 3, and the sequence of the extracted features of the TCP flows in Step 4,
each of the probability density matrices storing:
a probability density of one of the packets having extracted features in a specific one of the TCP flows corresponding to an equivalent one of the transport layer protocol types, so that each of the transport layer protocol types has a set of corresponding probability density matrices,
a probability density of the extracted features of the header of the specific TCP flow corresponding to the equivalent one of the transport layer protocol types;
Step 6, analyzing the extracted features of the specific TCP flow in an order in which the packets flow in the specific TCP flow in order to form the sequence of the extracted features;
Step 7, comparing the sequence of the extracted features obtained in Step 6 with the features stored in the protocol features library in Step 5, in order to obtain a probability value of the specific TCP flow belonging to a corresponding one of the transport layer protocol types; and
Step 8, determining a specific transport layer protocol type of the specific TCP flow corresponding to a maximum probability value for the transport layer protocol type according to the probability value in Step 7.

2. The features of the method of online TCP traffic identification of claim 1, the method further comprising:
collecting data using an offline approach,
classifying the data sets of the TCP flows,
extracting the features of the packets, and
establishing the protocol features library.

3. The features of the method of online TCP traffic identification of claim 1, wherein Step 4 further comprises:
extracting the features from the header of each of the TCP flows, and not extracting the features from each of the packets of each of the TCP flows.

4. The features of the method of online TCP traffic identification of claim 3, wherein features of the packets include:
features of individual ones of the packets, and
features of several associated ones of the packets.

5. The features of the method of online TCP traffic identification of claim 1, wherein the extracted features include:
a packet length, a packet interval time, and a transmission direction parameter in the sequence of the extracted features.

6. The features of the method of online TCP traffic identification of claim 5, the method further comprising:

calculating a packet interval time by deducting an influence of round-trip delay.

7. The features of the method of online TCP traffic identification of claim 1, the method further comprising:
collecting the extracted features in the order in which the packets arrive in the specific TCP flow.

8. The features of the method of online TCP traffic identification of claim 1, wherein Step 8, further comprises:
determining the transport layer protocol type of the specific TCP flow corresponding to a maximum weighted probability value.

9. A TCP (Transmission Control Protocol) traffic online identification device, which is used to implement the TCP flow online identification method of claim 1 by using the features in the header of the data flow,
the traffic online identification device comprising:
an online part including a protocol features library module;
an offline part including a first data flow separation module, a features extraction module, and a classification arbitration module connected in sequence one after another,
wherein the classification arbitration module is connected to the protocol features library module,
wherein the first data flow separation module is used to separate network live traffic data sets into different TCP flows looking for a start packet in each of the data flow flows, and a source address, a destination address, a source port, a destination port, and a transport layer protocol type of each packet in the data flows,
the features extraction module is used to extract the features from the header of the TCP flows in an order in which the packets flow, and to construct a sequence of the extracted features according to the order in which the packets flow in each of the TCP flows,
the classification arbitration module is used to compare the sequence of the extracted features with features in the protocol features library module, and to arbitrate according to a maximum probability principle or a maximum weighted probability principle, and
the protocol features library module is used to store protocol features of the packets obtained through analysis of previously accessed live traffic data sets;
the protocol features library module is used to establish additional groups of probability density matrices according to the transport layer protocol type and the sequence of the extracted features of the TCP flows;
wherein each of the probability density matrices stores:
a probability density of one of the packets having extracted features in a specific one of TCP flows corresponding to an equivalent one of the transport layer protocol types, so that each of the transport layer protocol types has a set of corresponding joint probability density matrices, and
a probability density of the extracted features of the header of the specific TCP flow corresponding to one of the transport layer protocol types.

10. The online TCP traffic identification device of claim 9, wherein the offline part also includes a data flow previous collection module, a second data flow separation module, and a data flow features extraction module connected in sequence one after another,
wherein the data flow features extraction module is connected to the protocol features library module.

* * * * *